(12) United States Patent
Hibino

(10) Patent No.: US 8,605,191 B2
(45) Date of Patent: Dec. 10, 2013

(54) IMAGING DEVICE

(75) Inventor: Hideo Hibino, Yamato (JP)

(73) Assignee: Nikon Corporation, Tokyo (JP)

( * ) Notice: Subject to any disclaimer, the term of this patent is extended or adjusted under 35 U.S.C. 154(b) by 863 days.

(21) Appl. No.: 12/698,398

(22) Filed: Feb. 2, 2010

(65) Prior Publication Data

US 2010/0215349 A1 Aug. 26, 2010

(30) Foreign Application Priority Data

Feb. 10, 2009 (JP) .................................. 2009-028777
Feb. 10, 2009 (JP) .................................. 2009-028778

(51) Int. Cl.
*H04N 5/222* (2006.01)
(52) U.S. Cl.
USPC .................................................... 348/333.11
(58) Field of Classification Search
USPC ....................................... 348/333.01, 333.11
See application file for complete search history.

(56) References Cited

U.S. PATENT DOCUMENTS

| 7,012,621 | B2 * | 3/2006 | Crosby et al. | ................. | 345/619 |
| 2004/0109071 | A1 | 6/2004 | Kido et al. | | |
| 2006/0093224 | A1 | 5/2006 | Uchino | | |
| 2006/0115235 | A1 | 6/2006 | Takikawa et al. | | |
| 2006/0126948 | A1 * | 6/2006 | Fukuhara et al. | ............. | 382/232 |
| 2006/0239574 | A1 * | 10/2006 | Brower et al. | ................. | 382/240 |
| 2009/0028530 | A1 | 1/2009 | Yamada et al. | | |
| 2011/0032387 | A1 | 2/2011 | Takahashi | | |

FOREIGN PATENT DOCUMENTS

| JP | A-10-108123 | 4/1998 |
| JP | A-2000-270252 | 9/2000 |
| JP | A-2001-211427 | 8/2001 |
| JP | A-2003-264764 | 9/2003 |
| JP | A-2004-187124 | 2/2004 |
| JP | A-2004-120341 | 4/2004 |
| JP | A-2006-109119 | 4/2006 |
| JP | A-2006-129152 | 5/2006 |
| JP | A-2007-259155 | 10/2007 |
| JP | A-2008-118508 | 5/2008 |
| JP | A-2009-033369 | 2/2009 |
| JP | A-2009-290860 | 12/2009 |

OTHER PUBLICATIONS

Jul. 16, 2013 Office Action issued in Japanese Patent Application No. 2009-028777 (with English translation).
Jul. 23, 2013 Office Action issued in Japanese Patent Application No. 2009-028778 (with English translation).

\* cited by examiner

*Primary Examiner* — James Hannett
(74) *Attorney, Agent, or Firm* — Oliff & Berridge, PLC

(57) ABSTRACT

An imaging device includes: an image sensor that captures a subject image at predetermined intervals and outputs image data sequentially; and a file generation unit that records a plurality of pieces of moving image data with different pixel decimation factors from the image data, which are moving image data being generated from the image data as a common source, and information indicating a correspondence relation between a reproduction time of moving image data and moving image data to be reproduced and displayed.

13 Claims, 18 Drawing Sheets

IMAGING DEVICE

INCORPORATION BY REFERENCE

The disclosures of the following priority applications are herein incorporated by reference:
Japanese Patent Application No. 2009-028777 filed Feb. 10, 2009
Japanese Patent Application No. 2009-028778 filed Feb. 10, 2009

BACKGROUND OF THE INVENTION

1. Field of the Invention

The present invention relates to an imaging device.

2. Description of Related Art

Japanese Laid Open Patent Publication No. 2000-270252 discloses a video camera that selectively records either image information captured by the camera or a part of the region of the image information that has been electronically zoomed in, or selectively displays either of the image information.

With conventional arts, a piece of image information that has not been electronically zoomed in and a piece of image information that has been electronically zoomed in are selectively recorded. Therefore, in the event that only a piece of image information that has been electronically zoomed in is recorded, a piece of image information that has not been electronically zoomed in can not be selected. In other words, a plurality of moving images with different magnification factors can not be obtained at a time.

SUMMARY OF THE INVENTION

An imaging device according to a first aspect of the present invention comprises: an image sensor that captures a subject image at predetermined intervals and outputs image data sequentially; and a file generation unit that records a plurality of pieces of moving image data with different pixel decimation factors from the image data, which are moving image data being generated from the image data as a common source, and information indicating a correspondence relation between a reproduction time of moving image data and moving image data to be reproduced and displayed.

According to a second aspect of the present invention, in the imaging device according to the first aspect, it is preferable that the plurality of pieces of moving image data include a first image data which represents a first range of the subject image by a first magnification factor and a second image data which represents a second range, which is included in the first range and narrower than the first range, by a second magnification factor, which is larger than the first magnification factor.

According to a third aspect of the present invention, the imaging device according to the second aspect is preferred to further comprise: an image-capturing control unit that controls the image sensor to output the first image data and the second image data in series; and a display unit on which a moving image reproduced based upon one of the first image data and the second image data is displayed.

According to a fourth aspect of the present invention, in the imaging device according to the third aspect, the image-capturing control unit may cause a pixel location, a pixel spacing, and a pixel range of the image sensor which outputs the image data, to be different between when the first image data is output and when the second image data is output.

According to a fifth aspect of the present invention, the imaging device according to the fourth aspect may further comprise: a display control unit that causes a display indicating the second range within the first range to be superimposed on a moving image while the moving image reproduced based upon the first image data is being displayed on the display unit; an operation member that sends an operation signal; and an instruction unit that instructs the image-capturing control unit so as to change a pixel location, a pixel spacing, and a pixel range of the image sensor in response to the operation signal.

According to a sixth aspect of the present invention, the imaging device according to the third aspect may further comprise: an operation member that sends an operation signal; and a display control unit that controls the display unit so as to switch according to the operation signal between a reproduction display of a moving image based upon the first image data and a reproduction display of a moving image based upon the second image data.

According to a seventh aspect of the present invention, in the imaging device according to the sixth aspect, it is preferable that the file generation unit causes the plurality of pieces of moving image data and information indicating a correspondence relation between reproduction time by the display unit and moving image data to be reproduced and displayed to be included in one file.

According to a eighth aspect of the present invention, in the imaging device according to the seventh aspect, the file generation unit may cause information for reproduction and display at a lower speed than a normal speed to be further included in the one file.

According to a ninth aspect of the present invention, the imaging device according to the first aspect may further comprise: a selection unit that selects one moving image data from among the plurality of pieces of moving image data; a signal generation unit that generates a moving image reproduction signal based upon the moving image data selected by the selection unit; and a selection control unit that controls the selection unit so as to select moving image data according to an instruction.

According to a tenth aspect of the present invention, in the imaging device according to the ninth aspect, it is preferable that the selection control unit controls the selection unit so as to select moving image data to be reproduced from among the plurality of pieces of moving image data based upon predefined information indicating a relationship between an elapsed time from a start time of reproduction and moving image data to be reproduced.

According to a eleventh aspect of the present invention, in the imaging device according to the tenth aspect, it is preferable that the selection control unit further controls the signal generation unit so as to generate the moving image reproduction signal by switching between a normal reproduction speed and a reproduction speed lower than the normal reproduction speed based upon predefined information indicating an elapsed time from a start time of reproduction and a time during which moving image data is reproduced in slow motion.

According to a twelfth aspect of the present invention, in the imaging device according to the eleventh aspect, it is preferable that information indicating a relationship between an elapsed time from the start time of reproduction and moving image data to be reproduced, information indicating an elapsed time from the start time of reproduction and a time during which moving image data is reproduced in slow motion, and the plurality of pieces of moving image data are included in one file.

According to a thirteenth aspect of the present invention, the imaging device according to the twelfth aspect may further comprise: an operation member that sends an operation signal; and an information modification unit that, according to the operation signal, modifies information indicating a relationship between an elapsed time from the start time of reproduction and moving image data to be reproduced.

According to a fourteenth aspect of the present invention, the imaging device according to the twelfth aspect may further comprise: an operation member that sends an operation signal; and an information modification unit that, according to the operation signal, modifies information indicating an elapsed time from the start time of reproduction and a time during which moving image data is reproduced in slow motion.

According to a fifteenth aspect of the present invention, in the imaging device according to the ninth aspect, it is preferable that an operation member that sends an operation signal is further provided, and that the signal generation unit further generates, prior to a start of reproduction, a still image reproduction signal so as to display the still images in an array based upon a plurality of pieces of still image data representative of each of the plurality of pieces of moving image data; and the selection control unit controls the selection unit so as to select, from among the plurality of pieces of moving image data, moving image data corresponding to a still image indicated by the operation signal sent from the operation member while the signal generation unit is generating the still image reproduction signal.

According to a sixteenth aspect of the present invention, in the imaging device according to the fifteenth aspect, it is preferable that the plurality of pieces of still image data representative of each of the plurality of pieces of moving image data and the plurality of pieces of moving image data are included in one file.

DESCRIPTION OF PREFERRED EMBODIMENTS

Figure 1:
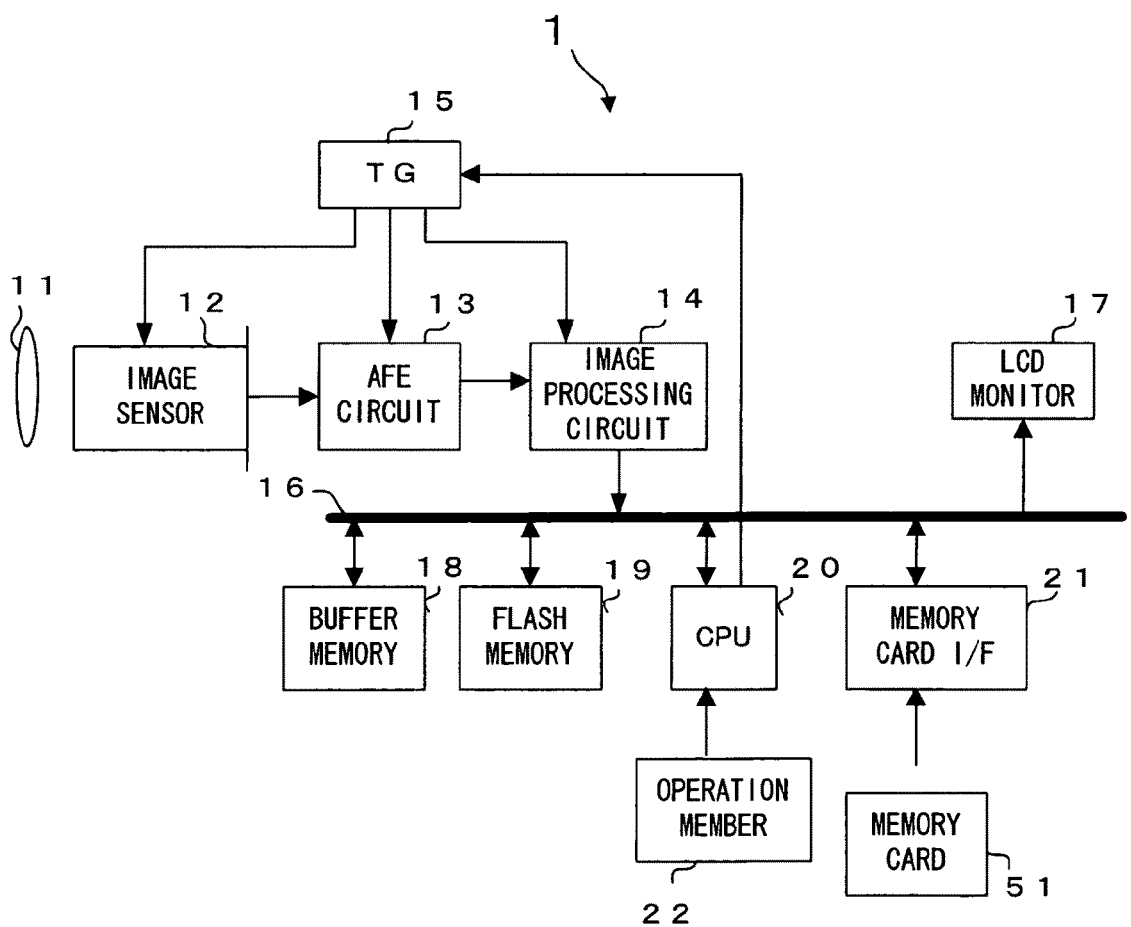
FIG. 1 is a block diagram of an example of the structure adopted in an electronic camera achieved in an embodiment of the present invention.

Embodiments of the present invention will now be explained with reference to the figures. FIG. 1 is a block diagram of an example of the structure adopted in an electronic camera 1 achieved in an embodiment of the present invention. In FIG. 1, the electronic camera 1 includes a photographic optical system 11, an image sensor 12, an analog front end (AFE) circuit 13, an image processing circuit 14, a timing generator (TG) 15, a liquid crystal display (LCD) monitor 17, a buffer memory 18, a flash memory 19, a central processing unit (CPU) 20, a memory card interface (I/F) 21, and an operation member 22.

The CPU 20, the buffer memory 18, the flash memory 19, the memory card interface 21, the image processing circuit 14, and the LCD monitor 17 are connected to one another via a bus 16.

The photographic optical system 11, which is constituted with a plurality of lens groups including a zoom lens and a focusing lens, forms a subject image on a light receiving surface of the image sensor 12. It is to be noted that the photographic optical system 11 is illustrated as a single lens in the interests of brevity of FIG. 1.

In response to an instruction sent out from the CPU 20, the TG 15 generates predetermined timing signals and supplies each timing signal to the image sensor 12, the AFE circuit 13, and the image processing circuit 14. The image sensor 12 and the like are driven and controlled by the timing signals so as to control the image-capturing timing by the image sensor 12 and the read timing of an analog image signal from the image sensor 12.

The image sensor 12 is constituted with a CCD image sensor, a CMOS image sensor, or the like in which light receiving elements are two-dimensionally arranged on the light receiving surface. The image sensor 12 generates an analog image signal by photoelectric conversion of a subject image by a light flux passing through the photographic optical system 11. The analog image signal is input to the AFE circuit 13.

The AFE circuit 13 performs analog processing such as correlated double sampling and gain adjustment to the analog image signal and converts the image signal having undergone the analog processing into digital image data. The digital image data is input to the image processing circuit 14. The image processing circuit 14 performs a variety of image processing (pixel interpolation processing, gradation conversion processing, edge enhancement processing, white balance adjustment processing, image compression processing, image decompression processing, and the like) on digital image data.

The LCD monitor 17, which is constituted with a liquid crystal panel, displays images, an operation menu screen, or the like in response to an instruction from the CPU 20. A touch operation member (not shown in the figure) is laminated on the display surface of the LCD monitor 17. In the event of being operated by touching by the user, the touch operation member generates a signal indicating a touch position on the operation member (that is, on the display screen of the LCD monitor 17) and sends it out to the CPU 20.

The buffer memory 18 temporarily stores digital image data before undergoing the image processing, during undergoing the image processing, and after undergoing the image processing performed by the image processing circuit 14. In addition, also in the event that two-image recording or four-image recording, described later, is performed, the buffer memory 18 ensures a sufficient storage capacity so as to temporarily store each image data (the first image data, the second image data, and so on). The flash memory 19 stores a program to be executed by the CPU 20.

The CPU 20 executes the program stored in the flash memory 19 so as to control operations performed by the electronic camera 1. The CPU 20 also performs an autofocus (AF) operation control and automatic exposure (AE) calculation. For the AF operation, for instance, a contrast detection method, in which the focusing position of the focusing lens (not shown in the figure) is obtained based upon contrast information of a through image, is used. A live view image is a monitor image that is repeatedly obtained at predetermined time intervals (for example, 30 frames/second=30 fps) by the image sensor 12 before instructing to capture an image. A live view image is also referred to as a through image.

The memory card interface 21 includes a connector (not shown in the figure), and a storage medium 51 such as a memory card is connected to the connector. The memory card interface 21 writes data on the connected storage medium 51 and reads data from the storage medium 51. The storage medium 51 is constituted with a memory card that has a built-in semiconductor memory, a hard disk drive, or the like.

The operation member 22 includes a release button 22a, a record switch 22i, zoom switches 22b and 22c, arrow switches 22g, a menu switch 22e, and the like, which are described later. The operation member 22 sends out an operation signal to the CPU 20 according to each operation such as a function operation and a menu selection operation.

Figure 2:
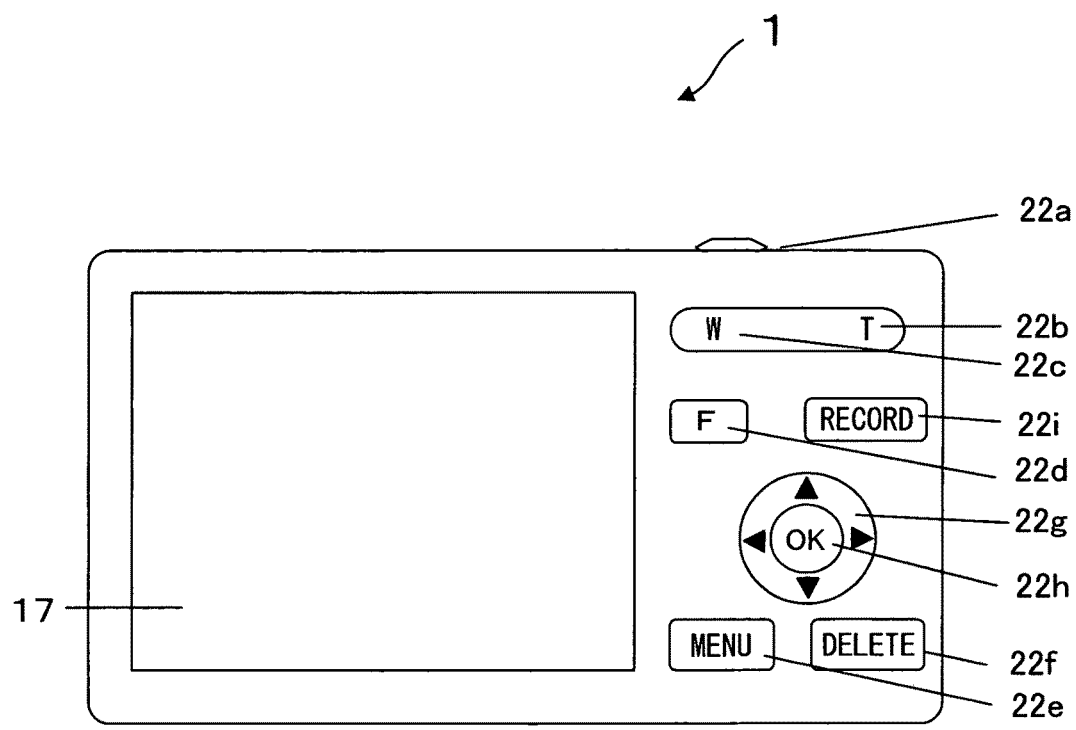
FIG. 2 is a rear view of the electronic camera.

FIG. 2 is a rear view of the electronic camera 1. The LCD monitor 17, the zoom switch 22b (T), the zoom switch 22c (W), a function (F) switch 22d, the record switch 22i, the menu switch 22e, a delete switch 22f, the arrow switches 22g, and an OK switch 22h are provided on the back of the electronic camera 1.

Figure 3:
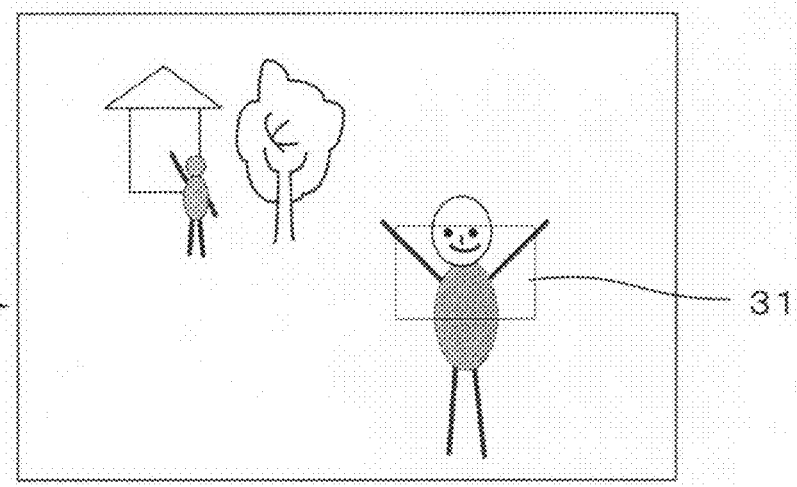
FIG. 3 illustrates an example of a display screen of a live view image.

The CPU 20 of the electronic camera 1 causes the LCD monitor 17 to display the live view image described above in the imaging mode. FIG. 3 illustrates an example of the display screen of the LCD monitor 17 on which a live view image is displayed. The live view image is displayed based upon pixel data that is decimated when read out among all the pixels included in the image sensor 12. Therefore, in the event that the number of display pixels of the LCD monitor 17 is less than that included in the image sensor 12, the decimation factor during data reading is set so as to reduce the definition of the live view image. The decimation may be in a simple decimation method or a pixel addition method. In the event that the image sensor 12 is caused to capture an image at 30 fps, the live view image can be displayed at 30 fps.

In the event that an operation signal is input from the release button 22a to the CPU 20 during displaying the live view image, the CPU 20 starts still image shooting processing to obtain a still image. Usually in the still image shooting, a recorded image is generated based upon pixel data read out from all the pixels included in the image sensor 12. It is to be noted that it is arranged that depending upon setting, a recorded image may be generated based upon pixel data read out at a predetermined decimation factor among all the pixels included in the image sensor 12, or, a recorded image may be generated based upon pixel data read out from a predetermined region among imaging regions included in the image sensor 12.

In addition, in the event that an operation signal is input from the record switch 22i to the CPU 20 during displaying the live view image, the CPU 20 starts moving image shooting processing to obtain a moving image. In moving image shooting, a recorded image is generated based upon pixel data read out at a predetermined decimation factor among all the pixels included in the image sensor 12, and a recorded image is generated based upon pixel data read out from a predetermined region among imaging regions included in the image sensor 12. In other words, a plurality of moving images are obtained during moving image shooting. It is arranged that the region at which pixel data is read out from the image sensor 12 can be modified by a setup operation described later.

Since the present embodiment is characterized by the operation in the event of obtaining a moving image, the following explanation will focus upon the moving image acquisition (recording) with an example of the two-image recording that obtains two images and the four-image recording that obtains four images.

—Moving Image Recording—
<Two-Image Recording>

In the event that an operation signal is input from the touch operation member (not shown in the figure) on the LCD monitor 17 to the CPU 20 during displaying the live view image, the CPU 20 causes a display frame 31 indicating the touched position to be displayed in a flashing manner, being overlapped (superimposed) on the live view image (FIG. 3). In the present example, the aspect ratio of the display frame 31 coincides with that of the display region of the LCD monitor 17. The display frame 31 indicates the image-capturing range of the second image during moving image acquisition (recording). The second image will be described later in detail.

In the event that an operation signal is input from the touch operation member (not shown in the figure) on the LCD monitor 17 to the CPU 20 with the display frame 31 flashing, the CPU 20 moves the central position of the display frame 31 to the newly touched position. In addition, in the event that an operation signal is input from the zoom switch 22c (W), the CPU 20 increases the size of the display frame 31 during flashing according to the number of operations, whilst in the event that an operation signal is input from the zoom switch 22b (T), the CPU 20 decreases the size of the display frame 31 during flashing according to the number of operations. In the event that an operation signal is input from the OK switch 22h, the CPU 20 modifies the display frame 31 at that point in time from flashing display to lighting display.

It is to be noted that in the event that the display position of the display frame 31 during lighting displaying is touched, the CPU 20 modifies the display frame 31 from lighting display to flashing display. In the event that an operation signal is input from the delete switch 22f, the CPU 20 deletes the display frame 31 in the state of flashing.

In the event that an operation signal is input from the record switch 22i, the CPU 20 starts image acquisition (recording) processing. The CPU 20 obtains a full-screen image and an enlarged image on a time sharing basis. A full-screen image (referred to as the first image) is an image corresponding to the whole imaging region of the image sensor 12, and an enlarged image (referred to as the second image) is an image corresponding to the region corresponding to the display frame 31 within the imaging region of the image sensor 12.

The CPU 20 modifies an extraction range (decimation factor) of the pixel data read out from the image sensor 12 according to the size of the display frame 31 when obtaining the second image. Enlargement processing is performed on the pixel data of the obtained second image so that the resolution thereof becomes equal to that of the first image.

Figure 4:
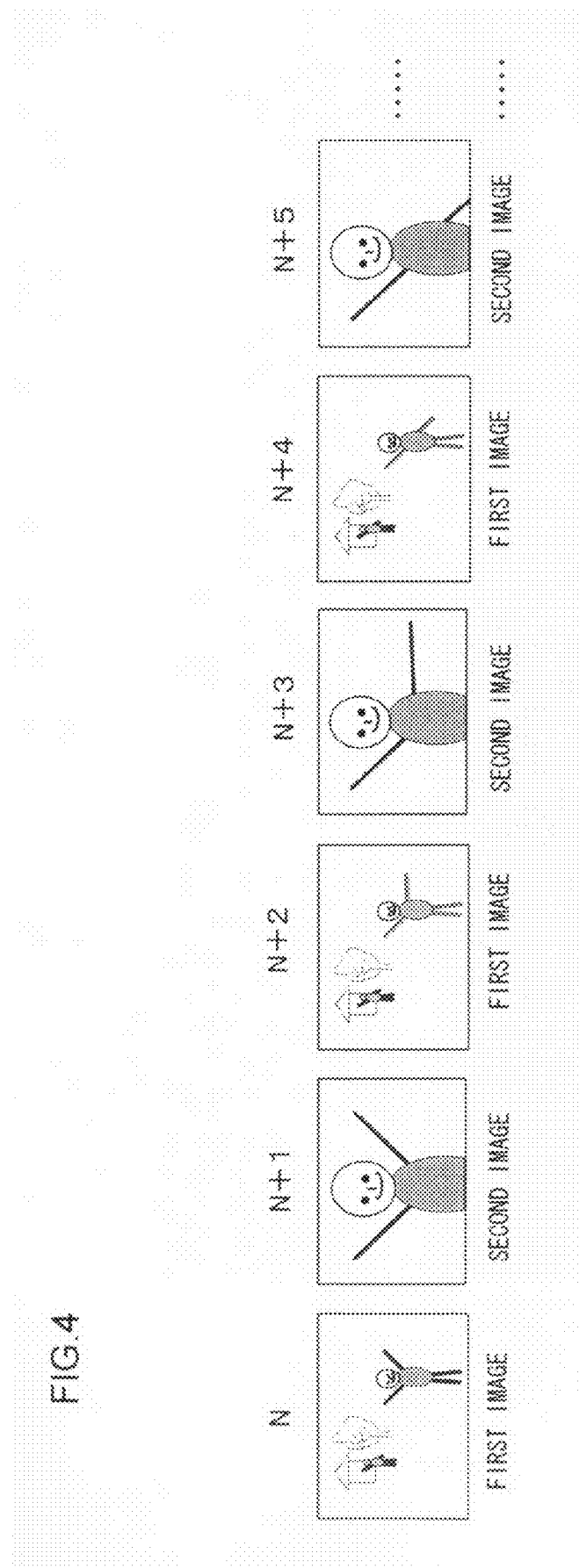
FIG. 4 illustrates an example of images obtained by an image sensor.

FIG. 4 illustrates an example of images obtained by the image sensor 12. Frame images are obtained in order of the Nth frame, the (N+1)th frame, the (N+2)th frame, the (N+3)th frame, the (N+4)th frame, the (N+5)th frame, and so on from the left. In the two-image recording, a full-screen image (the first image) and an enlarged image (the second image) are obtained alternately.

Figure 5:
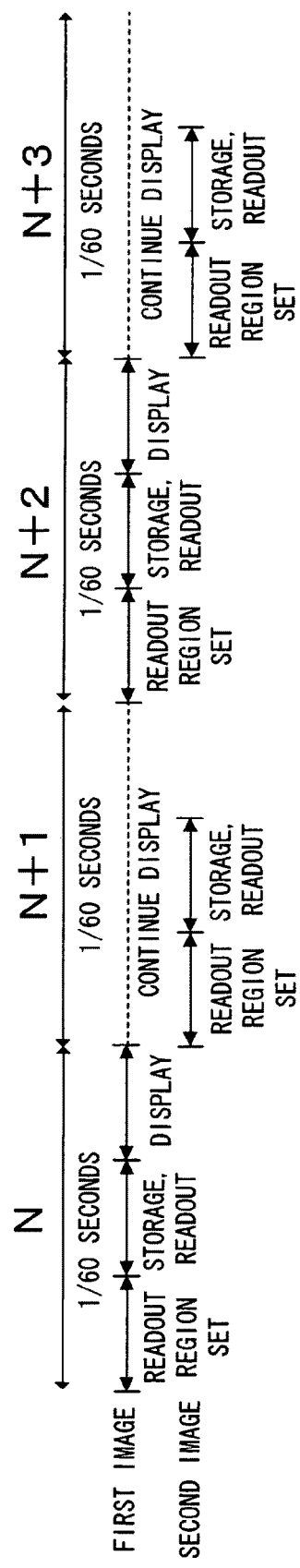
FIG. 5 illustrates the timing at which the first image and the second image are obtained alternately.

FIG. 5 is a time chart illustrating the timing at which the first image and the second image are obtained alternately. In the Nth frame the CPU 20 causes the first image to be captured (i.e., setting the image-capturing signal readout region, storing charge, and reading out the image-capturing signal) and displayed on the LCD monitor 17 in 1/60 seconds. In the following (N+1)th frame the CPU 20 causes the display of the previous frame to be continued. Then, in the following frame (N+2) the CPU 20 causes the first image to be captured and displayed in 1/60 seconds. As a result, while the first image is being recorded every 1/30 seconds, i.e., at a frame rate of 30 fps, the obtained first image is being displayed on the display screen of the LCD monitor 17.

In addition, in the (N+1)th frame of FIG. 5 the CPU 20 captures the second image (setting the image-capturing signal readout region, storing charge, and reading out the image-capturing signal) within 1/60 seconds. Then, in the frame (N+3), which is the next after one frame (N+2), the CPU 20 captures the second image within 1/60 seconds. As a result, while the first image is recorded at a frame rate of 30 fps, the second image is also recorded at a frame rate of 30 fps.

Figure 6:
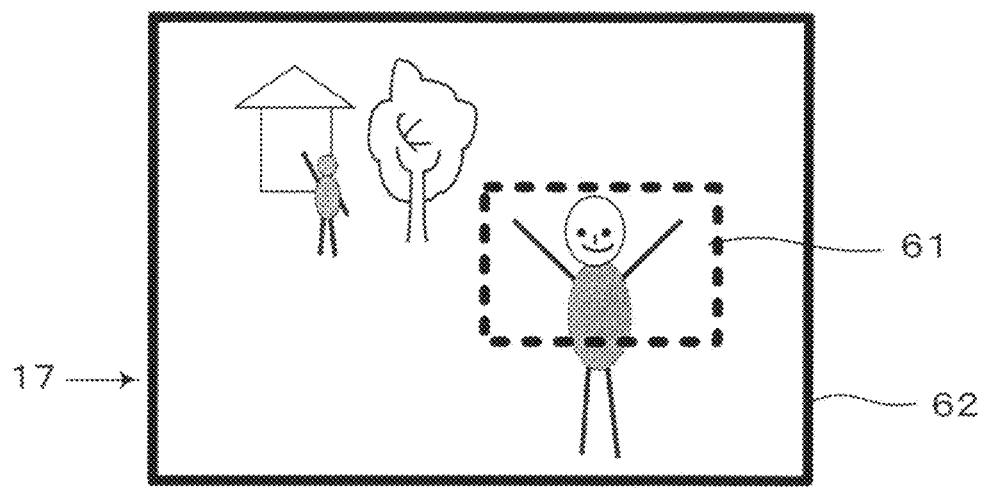
FIG. 6 illustrates an example of a display screen during the two-image recording.

FIG. 6 illustrates an example of the display screen of the LCD monitor 17 during the two-image recording. The CPU 20 causes a frame 62 (the thick solid line in the present example), which indicates the image-capturing range of the first image, to be displayed in order to indicate that the first image is being recorded. In addition, the CPU 20 causes a frame 61, which indicates the image-capturing range of the second image, to be displayed in a different mode (the thick dashed line in the present example) from that of the frame 62, in order to indicate that the second image is being recorded.

The two-image recording explained above is performed both in the event that setup of the display frame 31 (lighting display) has been performed and in the event that setup of the display frame 31 has not been performed. In the event that the display frame 31 has not been set, it is handled that null data has been recorded with respect to the second image in place of recording the second image.

<Four-Image Recording>

Figure 18:
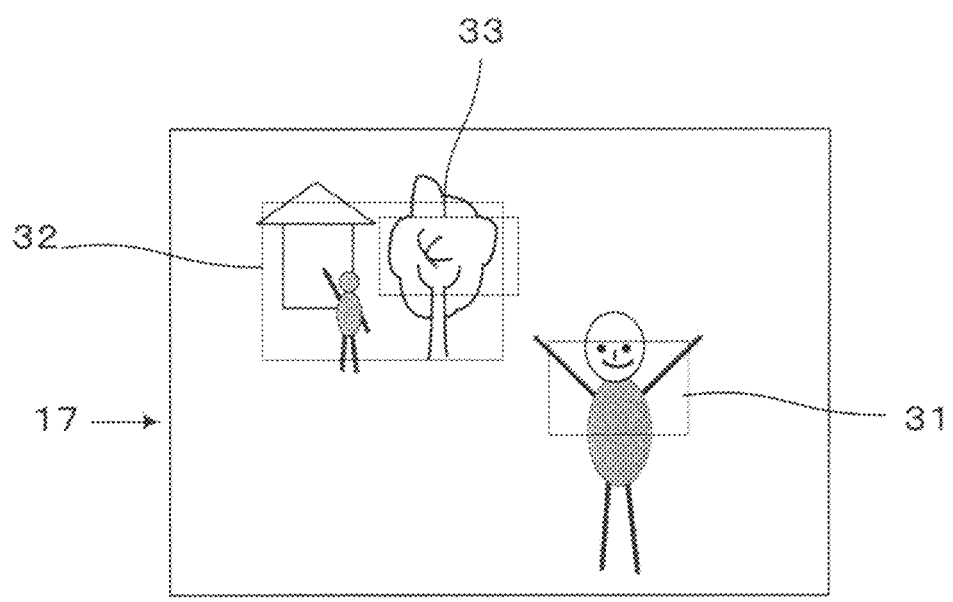
FIG. 18 illustrates an example of the display screen of a live view image.

In the event that another operation signal is input from the touch operation member (not shown in the figure) on the LCD monitor 17 to the CPU 20 during lighting displaying of the display frame 31 overlapped on the live view image, the CPU 20 causes a display frame 32 (refer to FIG. 18) indicating the touched position to be displayed in a flashing manner, being overlapped (superimposed) on the live view image. In the present example, in the same manner in the case of the display frame 31, the aspect ratio of the display frame 32 coincides with that of the display region of the LCD monitor 17. The display frame 32 indicates the image-capturing range of the third image during moving image acquisition (recording). The third image will be described later in detail.

In the event that an operation signal is input from the touch operation member (not shown in the figure) on the LCD monitor 17 to the CPU 20 with the display frame 32 flashing, the CPU 20 moves the central position of the display frame 32 to the newly touched position. In addition, in the event that an operation signal is input from the zoom switch 22c (W), the CPU 20 increases the size of the display frame 32 during flashing according to the number of operations, whilst in the event that an operation signal is input from the zoom switch 22b (T), the CPU 20 decreases the size of the display frame 32 during flashing according to the number of operations. In the event that an operation signal is input from the OK switch 22h, the CPU 20 modifies the display frame 32 at that point in time from flashing display to lighting display.

In the event that another operation signal is input from the touch operation member (not shown in the figure) on the LCD monitor 17 to the CPU 20 during lighting displaying of the display frame 31 and the display frame 32 overlapped on the live view image, the CPU 20 causes a display frame 33 (refer to FIG. 18) indicating the touched position to be displayed in a flashing manner, being overlapped (superimposed) on the live view image. Also in the same manner in the cases of the display frames 31 and 32, the aspect ratio of the display frame 33 coincides with that of the display region of the LCD monitor 17. The display frame 33 indicates the image-capturing range of the fourth image during moving image acquisition (recording). The fourth image will be described later in detail.

In the event that an operation signal is input from the touch operation member (not shown in the figure) on the LCD monitor 17 to the CPU 20 with the display frame 33 flashing, the CPU 20 moves the central position of the display frame 33 to the newly touched position. In addition, in the event that an operation signal is input from the zoom switch 22c (W), the CPU 20 increases the size of the display frame 33 during flashing according to the number of operations, whilst in the event that an operation signal is input from the zoom switch 22b (T), the CPU 20 decreases the size of the display frame 33 during flashing according to the number of operations. In the event that an operation signal is input from the OK switch 22h, the CPU 20 modifies the display frame 33 at that point in time from flashing display to lighting display.

It is to be noted that in the event that the display position of any of the display frames 31, 32, and 33 during lighting displaying is touched, the CPU 20 modifies the corresponding display frame from lighting display to flashing display. In the event that an operation signal is input from the delete switch 22f, the CPU 20 deletes the display frame in the state of flashing.

In the event that an operation signal is input from the record switch 22i, the CPU 20 starts image acquisition (recording) processing. The CPU 20 obtains a full-screen image and three enlarged images on a time sharing basis. The full-screen image (referred to as the first image) is an image corresponding to the whole imaging region of the image sensor 12. The three enlarged images are an image corresponding to the region corresponding to the display frame 31 (referred to as the second image), an image corresponding to the region corresponding to the display frame 32 (referred to as the third image), and an image corresponding to the region corresponding to the display frame 33 (referred to as the fourth image), within the imaging region of the image sensor 12.

In the same manner in the case of the two-image recording, the CPU 20 sets the decimation factor with which pixel data is read out from the image sensor 12 higher as the display frames 31, 32, and 33 are larger in size, whilst it sets the decimation factor with which pixel data is read out from the image sensor 12 lower as the display frames 31, 32, and 33 are smaller in size.

Figure 7:
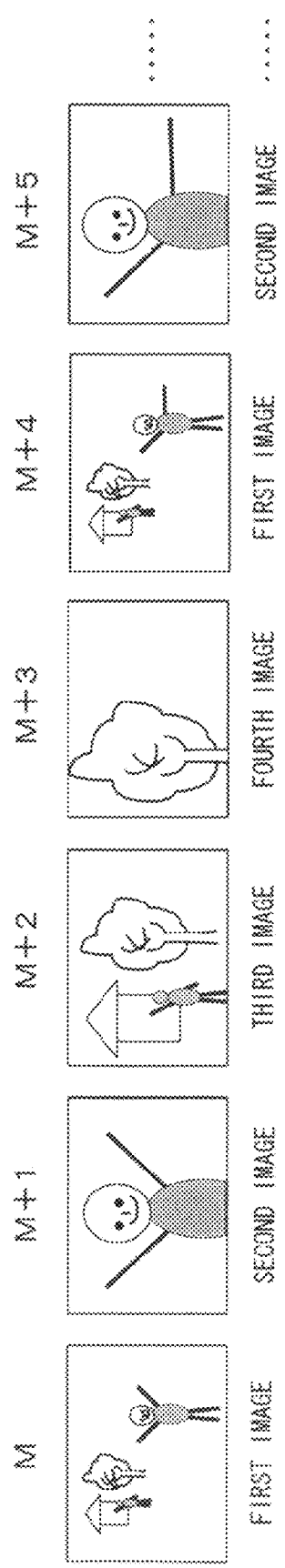
FIG. 7 illustrates an example of images obtained by the image sensor.

FIG. 7 illustrates an example of images obtained by the image sensor 12. Frame images are obtained in order of the Mth frame, the (M+1)th frame, the (M+2)th frame, the (M+3)th frame, the (M+4)th frame, the (M+5)th frame, and so on from the left. In the four-image recording, the first image, which is a full-screen image, and the second image, the third image, and the fourth image, which are enlarged images, are obtained in this order.

Figure 8:
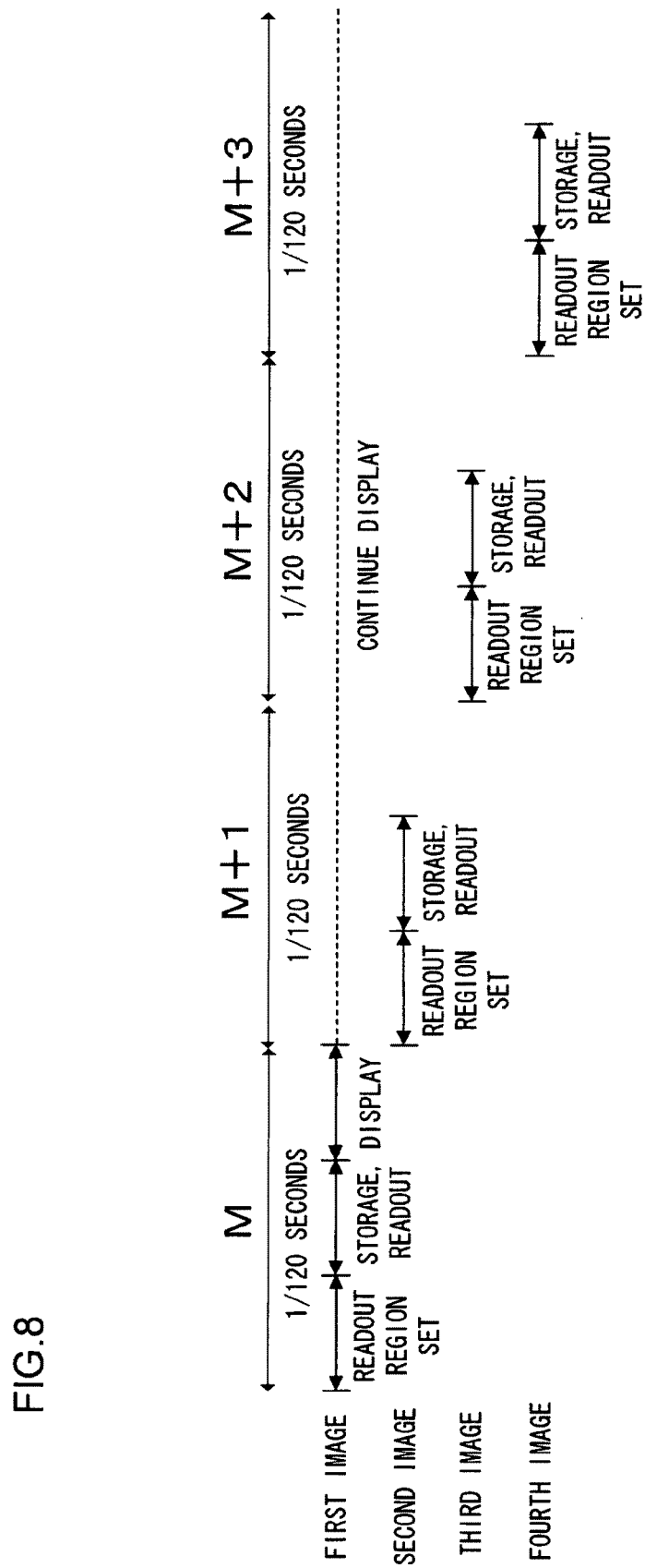
FIG. 8 illustrates the timing at which the first image to the fourth image are obtained in series.

FIG. 8 is a time chart illustrating the timing at which the first image to the fourth image are obtained in series. In the Mth frame the CPU 20 causes the first image to be captured (setting the image-capturing signal readout region, storing charge, and reading out the image-capturing signal) and displayed on the LCD monitor 17 in $1/120$ seconds. In the following three frames (M+1) to (M+3) the CPU 20 causes the display of the previous frame to be continued. Then, in the following frame ((M+4) although not shown in the figure) the CPU 20 causes the first image to be captured and displayed in $1/120$ seconds. As a result, while the first image is being recorded every $1/30$ seconds, i.e., at a frame rate of 30 fps, the obtained first image is being displayed on the display screen of the LCD monitor 17.

In the (M+1)th frame of FIG. 8 the CPU 20 captures the second image (setting the image-capturing signal readout region, storing charge, and reading out the image-capturing signal) within $1/120$ seconds. Then, in the frame ((M+5) although not shown in the figure), which is the next after the subsequent three frames (M+2) to (M+4), the CPU 20 captures the second image within $1/120$ seconds. As a result, while the first image is recorded at a frame rate of 30 fps, the second image is also recorded at a frame rate of 30 fps.

In addition, in the (M+2)th frame the CPU 20 captures the third image (setting the image-capturing signal readout region, storing charge, and reading out the image-capturing signal) within $1/120$ seconds. Then, in the frame ((M+6) although not shown in the figure), which is the next after the subsequent three frames (M+3) to (M+5), the CPU 20 captures the third image within $1/120$ seconds. As a result, while the first image is recorded at a frame rate of 30 fps, the third image is also recorded at a frame rate of 30 fps.

Furthermore, in the (M+3)th frame the CPU 20 captures the fourth image (setting the image-capturing signal readout region, storing charge, and reading out the image-capturing signal) within $1/120$ seconds. Then, in the frame ((M+7) although not shown in the figure), which is the next after the subsequent three frames (M+4) to (M+6), the CPU 20 captures the fourth image within $1/120$ seconds. As a result, while the first image is recorded at a frame rate of 30 fps, the fourth image is also recorded at a frame rate of 30 fps.

Figure 9:
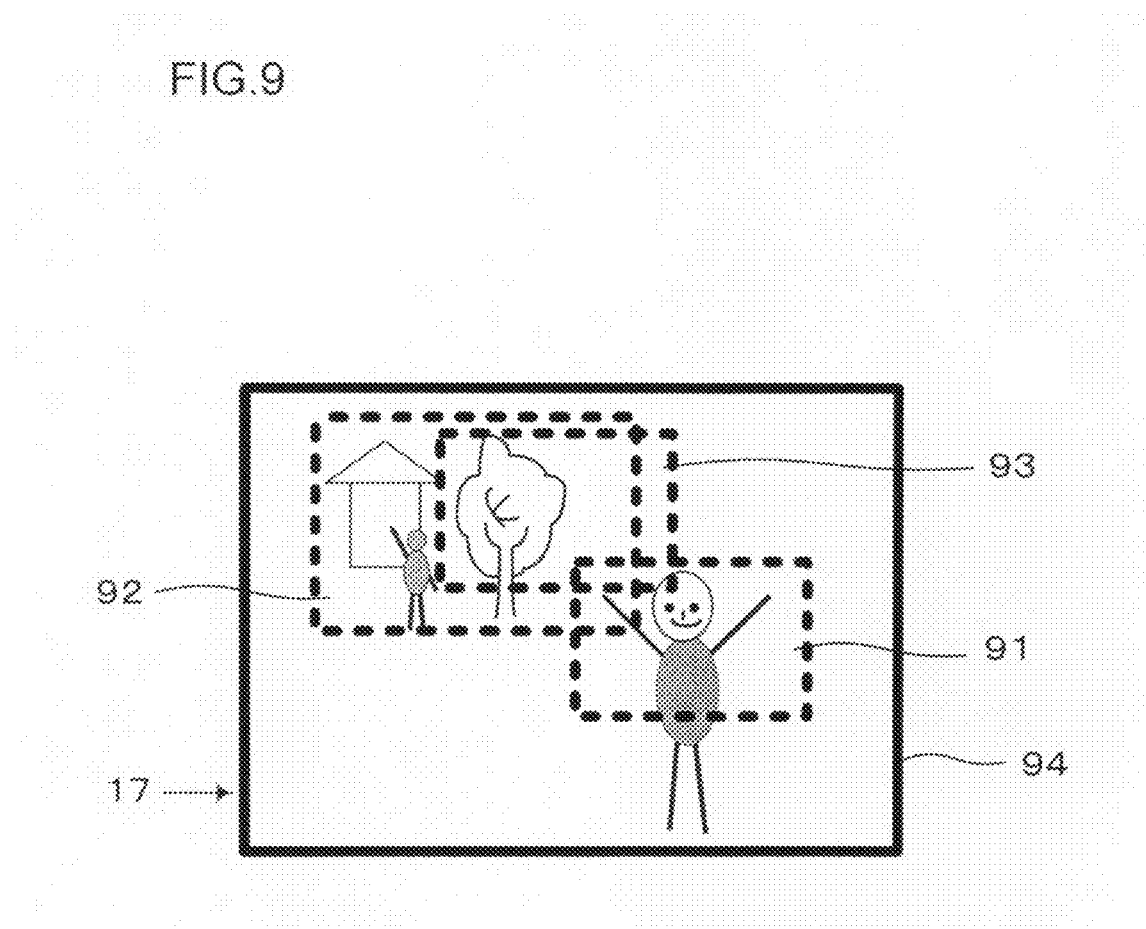
FIG. 9 illustrates an example of the display screen during the four-image recording.

FIG. 9 illustrates an example of the display screen of the LCD monitor 17 during the four-image recording. The CPU 20 causes a frame 94 (the thick solid line in the present example), which indicates the image-capturing range of the first image, to be displayed in order to indicate that the first image is being recorded. The CPU 20 causes a frame 91, which indicates the image-capturing range of the second image, to be displayed in a different mode (the thick dashed line in the present example) from that of the frame 94, in order to indicate that the second image is being recorded. In addition, the CPU 20 causes a frame 92, which indicates the image-capturing range of the third image, and a frame 93, which indicates the image-capturing range of the fourth image, to be displayed in a yet different mode (for instance, thick dashed lines in different colors), in order to indicate that the third image and the fourth image are being recorded.

The four-image recording explained above is performed in the event that setup of the display frames 91 to 93 (lighting display) has been performed and in the event that setup of display frames 91 to 92 has been performed. In the event that the display frame 93 has not been set, it is handled that null data has been recorded with respect to the fourth image in place of recording the fourth image.

<Display Switching During Recording>

Figure 10:
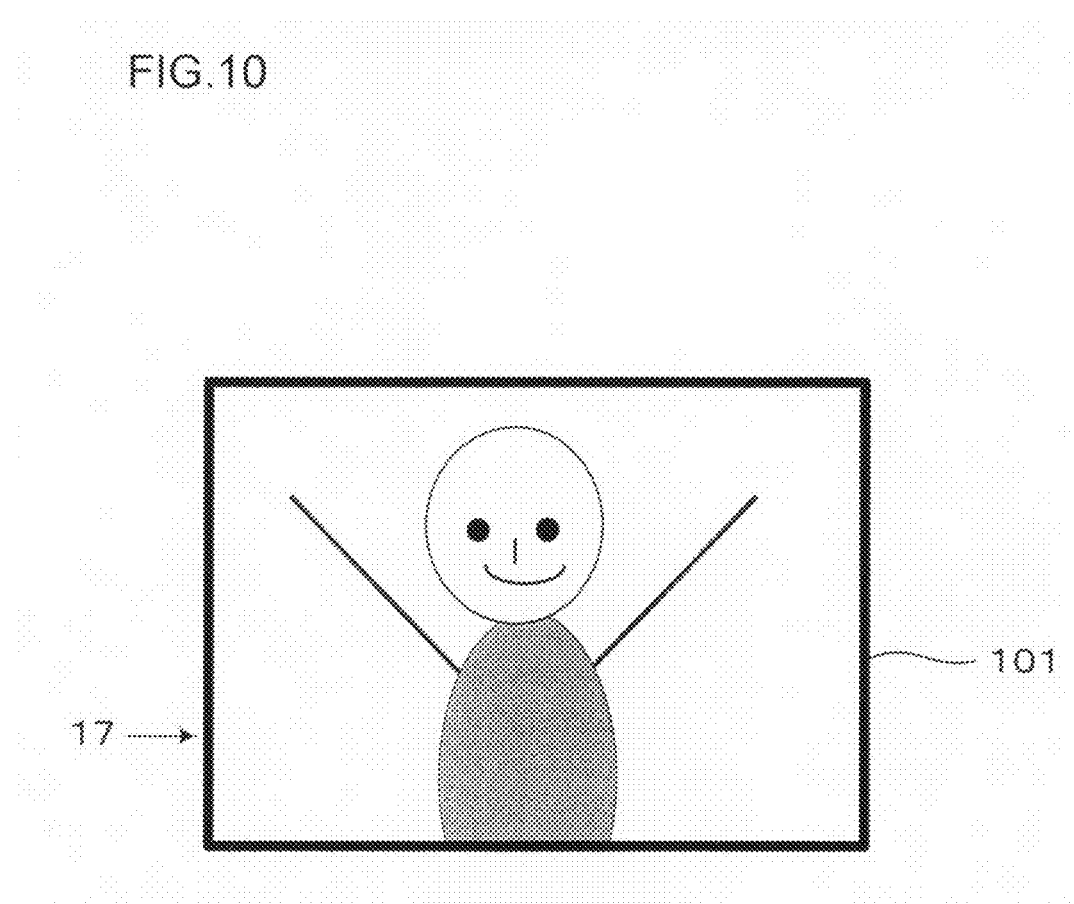
FIG. 10 illustrates an example of the display of the second image.

In the event that the display position of any of the display frames 61 and 91 to 93 is operated by touching while the example of the screen shown in FIG. 6 or FIG. 9 is being displayed on the LCD monitor 17 during recording, the CPU 20 causes an enlarged image (any of the second image to the fourth image) corresponding to the display frame having been operated by touching to be displayed on the screen of the LCD monitor 17. FIG. 10 illustrates an example of the display of the second image corresponding to the display frame 61 of FIG. 6 and the display frame 91 of FIG. 9. A frame 101 (the thick solid line in the present example), which indicates the image-capturing range of the second image, indicates that the second image is being recorded.

In place of the time chart of FIG. 5, in the (N)th frame the CPU 20 captures the first image (setting the image-capturing signal readout region, storing charge, and reading out the image-capturing signal) within $1/60$ seconds and, in the next frame (N+2) after one frame, captures the first image within $1/60$ seconds so as to display the example of the screen shown in FIG. 10 on the LCD monitor 17.

In addition, in the (N+1)th frame the CPU 20 causes the second image to be captured (setting the image-capturing signal readout region, storing charge, and reading out the image-capturing signal) and displayed on the LCD monitor 17 in $1/60$ seconds. In the following (N+2)th frame the CPU 20 causes the display of the previous frame to be continued. Then, in the following frame (N+3) the CPU 20 causes the second image to be captured and displayed in $1/60$ seconds. As a result, while the second image is being recorded every $1/30$ seconds, i.e., at a frame rate of 30 fps, the obtained second image is being displayed on the display screen of the LCD monitor 17.

In the event that anywhere in the screen has undergone a double-touch operation (for example, twice or more within 0.5 seconds) while the example of the screen shown in FIG. 10 is being displayed on the LCD monitor 17, the CPU 20 causes the original screen (FIG. 6 or FIG. 9) to be displayed on the LCD monitor 17 in place of the example of the screen shown in FIG. 10. In the event of returning the display screen from that shown in the FIG. 10 to that shown in FIG. 6, the control may be returned to that shown in the time chart of FIG. 5.

Figure 11:
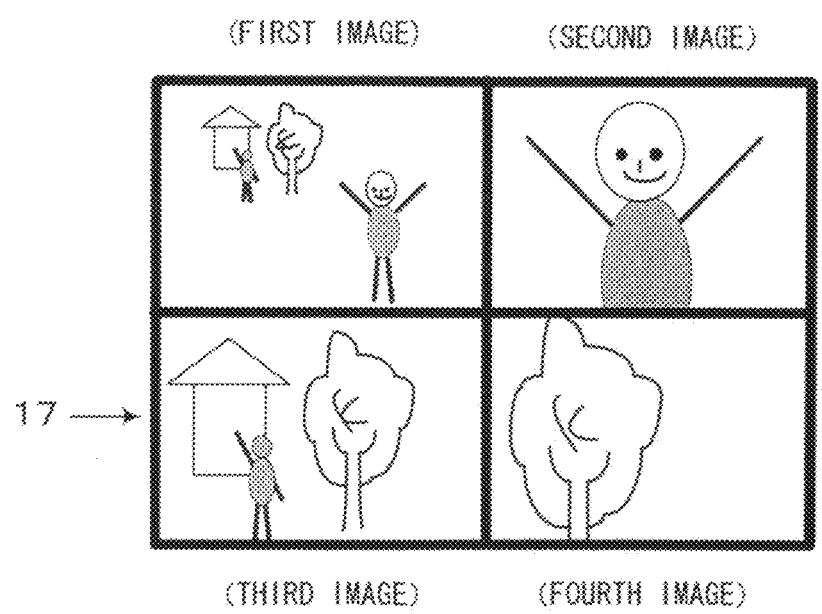
FIG. 11 illustrates an example of the display of the first image to the fourth image.

In addition, in the event that anywhere in the screen has undergone a double-touch operation (for example, twice or more within 0.5 seconds) while the example of the screen shown in FIG. 9 is being displayed on the LCD monitor 17, the CPU 20 causes the example of the screen shown in FIG. 11 to be displayed on the LCD monitor 17 in place of the example of the screen shown in FIG. 9. FIG. 11 illustrates an example of the first image (top left), the second image (top right), the third image (bottom left), and the fourth image (bottom right), which are displayed in an array.

In the event that any of the display positions of the first image to the fourth image is subjected to a touch operation while the example of the screen shown in FIG. 11 is being displayed on the LCD monitor 17, the CPU 20 causes the LCD monitor 17 to display an enlarged corresponding image in the screen. More specifically, the CPU 20 causes the LCD monitor 17 to display the example of the screen shown in FIG. 9 in the event that the display position of the first image is operated by touching, whilst the CPU 20 causes the LCD monitor 17 to display the example of the screen shown in FIG. 10 in the event that the display position of the second image is operated by touching. In the same manner, an enlarged corresponding image is displayed on the screen of the LCD monitor 17 in the event that the display position of the third image and the display position of the fourth image are each operated by touching.

An image file, being generated by the CPU 20 and recorded in the storage medium 51, includes a plurality of moving image data therein. This file structure includes, as shown by the example in FIG. 12, a tag region 121 in which ancillary information of the image is recorded and a data region 122 in which each data is recorded.

The CPU 20 stores a photographic condition, photographing date and time, the number of scenes (two in the event of the two-image recording, and four in the event of the four-image recording), and thumbnail image information in a header portion of the whole file. The thumbnail image information is a thumbnail image that represents each of the moving images, that is, the first image to the fourth image (for instance, generated from the data of the first one second).

The CPU 20 records each of scene select information, timetable information, and slow reproduction information as a tag. The scene select information is information indicating the image that was displayed on the screen of the LCD monitor 17 during recording. For instance, it is indicated that the first image was displayed from the first one second to the fifth one second, the third image was displayed from the sixth one second to the tenth one second, and the second image was displayed from the 11th one second to the nth one second.

The timetable information is information indicating the image to be reproduced and displayed on the screen of the LCD monitor 17 during reproduction. For example, it is indicated that the first image is to be reproduced and displayed from the first one second to the tenth one second, the second image is to be reproduced and displayed from the 11th one second to the 15th one second, and the fourth image is to be reproduced and displayed from the 16th one second to the nth one second. It is arranged that although the default value of the timetable information is set so as to reproduce and display the first image from the first one second to the nth one second, the timetable information can be modified by an editing operation for moving image reproduction described later.

The slow reproduction information is information indicating a section in which the image is to be reproduced in slow motion during reproduction. For instance, it is indicated that the section from the 12th one second to the 14th one second is reproduced at a rate of ⅓ times as slow as that in normal time. It is arranged that although the default value of the slow reproduction information is set so as to reproduce and display the image at normal speed from the first one second to the nth one second, the slow reproduction information can be modified by an editing operation for moving image reproduction described later.

The CPU 20 amplifies an audio signal picked up by a microphone (not shown in the figure), converts the amplified signal into digital audio data, and stores an audio file having undergone a predetermined filing.

A moving image file is divided by an interval of a predetermined length of time (for instance, one second) so as to record it as a set of data each of which is the predetermined length of time. According to FIG. 12, the first image, the second image, the third image, and the fourth image of the first one second are handled as one set, and the first image, the second image, the third image, and the fourth image of the following one second are handled as one set in the same manner, so that each of them is recorded as one set of image data.

In the event of the two-image recording and in the event of the four-image recording, AE (automatic exposure calculation), WB (white balance processing), and AF processing are normally performed based upon the data of the first image. It is to be noted that AF processing is preferably performed based upon the data of an image in which a zoom area exists if there is any zoom area therein. In addition, AF processing may be performed based upon the data of the enlarged image instructed by a menu setup operation for image-capturing.

—Moving Image Reproduction—

Figure 12:
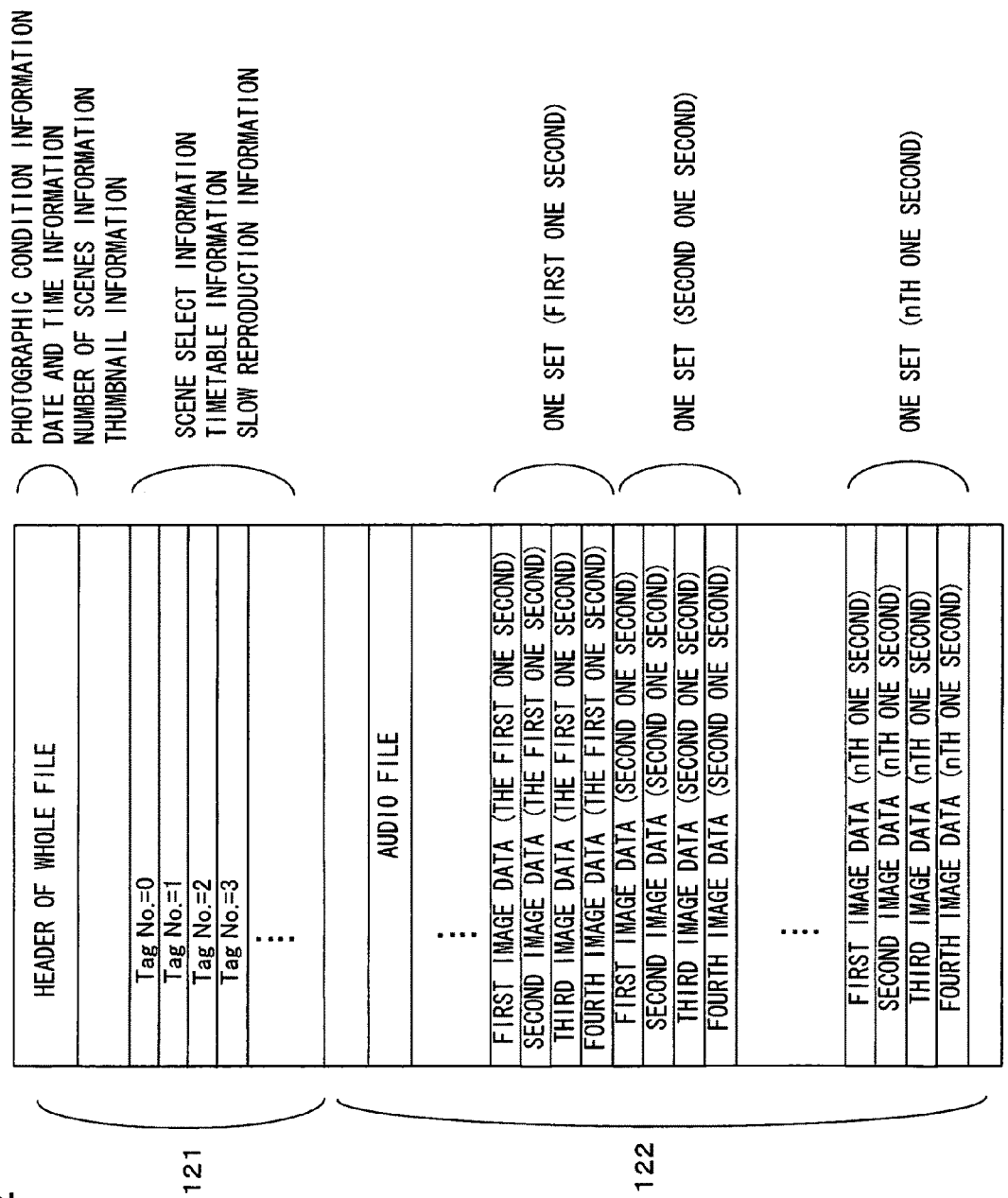
FIG. 12 illustrates the file structure to be recorded in a storage medium.
Figure 13:
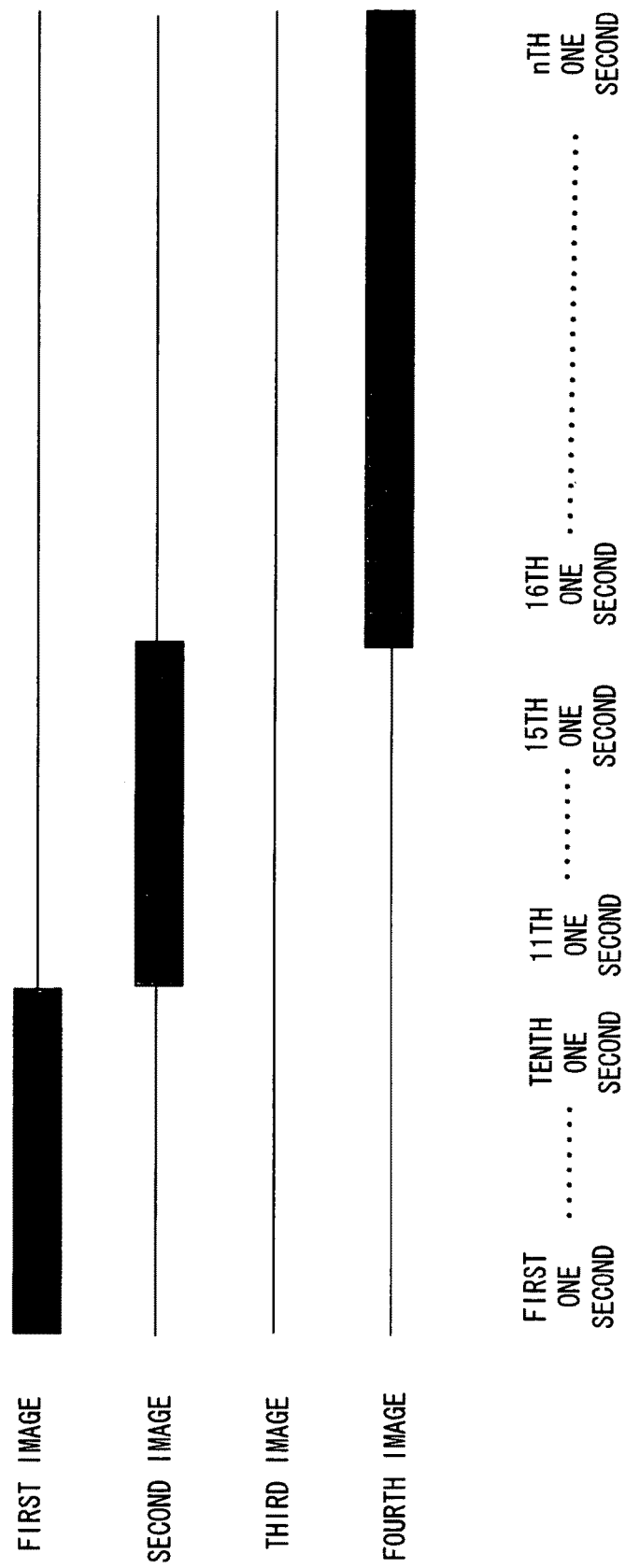
FIG. 13 illustrates an example of a timetable based upon timetable information.

The moving image reproduction based upon the image file (FIG. 12) recorded as described above will now be explained. FIG. 13 illustrates an example of a timetable based upon timetable information. FIG. 13 indicates that the first image is reproduced and displayed from the first one second to the tenth one second, the second image is reproduced and displayed from the 11th one second to the 15th one second, and the fourth image is reproduced and displayed from the 16th one second to the nth one second. The default value of the timetable information is set so as to reproduce and display the first image from the first one second to the nth one second.

Figure 14:
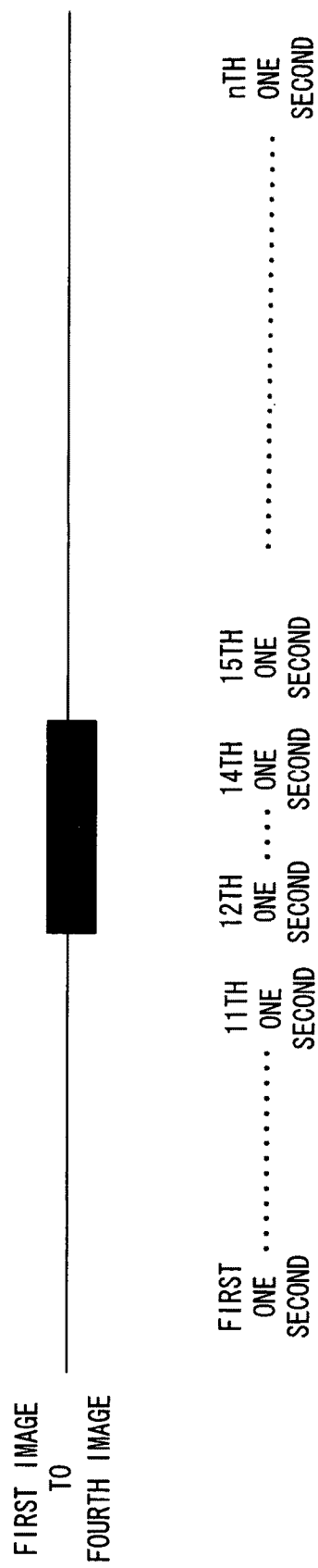
FIG. 14 illustrates an example of a timetable based upon slow reproduction information.

FIG. 14 illustrates an example of a timetable based upon slow reproduction information. FIG. 14 indicates that the section from the 12th one second to the 14th one second is reproduced at a rate of ⅓ times as slow as that in normal time and the other sections are reproduced and displayed at normal speed. The default value of the slow reproduction information is set so as to reproduce and display the first one second to the nth one second at normal speed.

Figure 15:
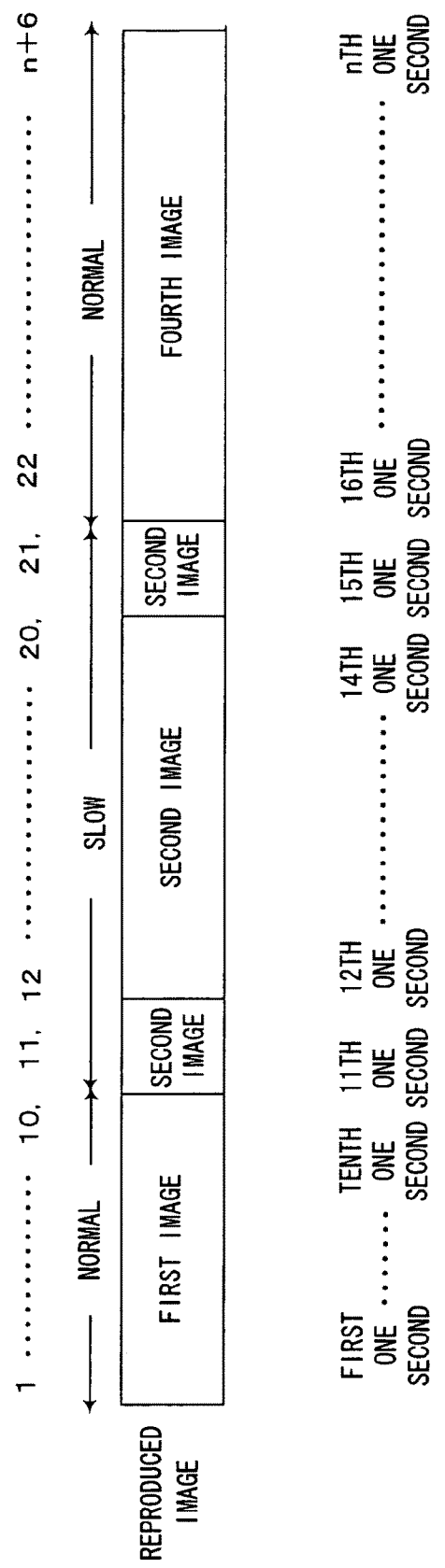
FIG. 15 illustrates a reproduction image signal.

The CPU 20 generates a reproduction image signal using the timetable information and the slow reproduction information. FIG. 15 illustrates a reproduction image signal that causes the LCD monitor 17 to display a moving image thereon. According to FIG. 15, along the reproduction time axis, the first image is reproduced and displayed at normal speed from the first one second to the tenth one second, the second image is reproduced at normal speed during the 11th one second, the second image is reproduced at a slow reproduction speed from the 12th one second to the 20th one second, the second image is reproduced at normal speed during the 21st one second, the fourth image is reproduced and displayed at normal speed from the 22nd one second to the (n+6)th one second. Since the moving image of duration of three seconds during recording is reproduced in slow motion at a rate of ⅓ times (9 seconds), a reproduction time becomes longer than that during recording by six seconds.

The edition for moving image reproduction will be explained. In the event that display of a plurality of thumbnails is instructed by a menu operation, the CPU 20 causes the LCD monitor 17 to display thumbnail images thereon in an array as the example shown in FIG. 16. Each of the thumbnail images is generated based upon information stored in the header portion of the whole moving image file as the example shown in FIG. 12.

Figure 16:
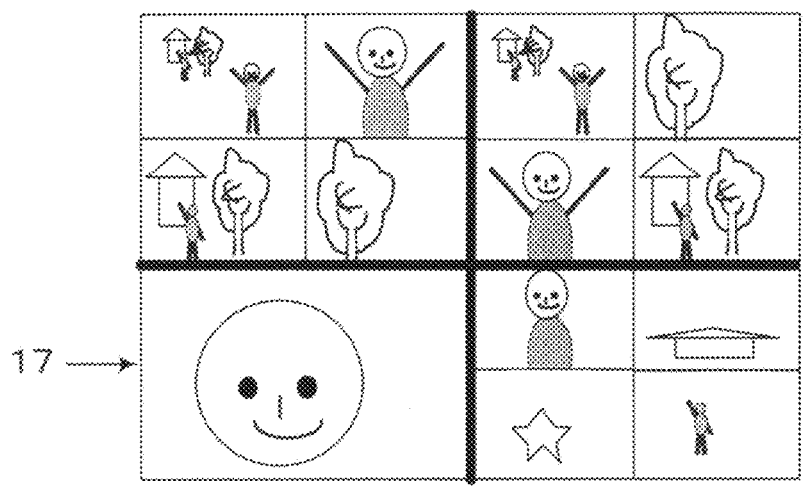
FIG. 16 illustrates an example of a list of thumbnail images.

In FIG. 16 the top left of the screen is a representative image of the first image to the fourth image generated based upon the data of the first one second of a moving image file in which the first image to the fourth image are recorded. In addition, in FIG. 16 the top right of the screen is a representative image of the first image to the fourth image generated based upon the data of the first one second of a moving image file in which the first image to the fourth image are recorded.

In FIG. 16 the bottom left of the screen is a representative image of the first image to the second image generated based upon the data of the first one second of a moving image file in which the first image to the second image are recorded. In the two-image recording, in the event that the second image is handled as null data because of the display frame 31 not having been set, only a representative image of the first image is displayed as the bottom left screen of FIG. 16.

In FIG. 16 the bottom right of the screen is a representative image of the first image to the fourth image generated based upon the data of the first one second of a moving image file in which the first image to the fourth image are recorded. In the event that an operation signal that indicates a right-left operation of the arrow switches 22g is input, the CPU 20 causes the LCD monitor 17 to display a thumbnail image representative of another moving image file that is not displayed thereon. In the event that (the display position of) the thumbnail image is operated by touching during displaying, the CPU 20 starts a reproduction display operation of the corresponding moving image file. The image to be displayed on the LCD monitor 17 and the reproduction speed follow the reproduction image signal as the example shown in FIG. 15.

<Edition for Moving Image Reproduction>

In the event that anywhere in the screen has undergone a double-touch operation (for example, twice or more within 0.5 seconds) while any image of the first image to the fourth image (for example, the same one as FIG. 10) is being reproduced and displayed, the CPU 20 causes the LCD monitor 17 to display thereon the same screen as FIG. 11 in place of the screen being displayed. FIG. 11 illustrates the first image (the top left), the second image (the top right), the third image (the bottom left), and the fourth image (the bottom right), which are displayed in a grid pattern. It is to be noted that indications by a thick line as in the examples of FIG. 10 and FIG. 11 are omitted during reproducing and displaying.

In the event that any of the display positions of the first image to the fourth image is operated by touching while the same screen as FIG. 11 is being displayed on the LCD monitor 17, the CPU 20 causes the LCD monitor 17 to display an enlarged corresponding image on the screen thereof. More specifically, the CPU 20 causes the LCD monitor 17 to display thereon the same screen as FIG. 9 in the event that the display position of the first image is operated by touching, whilst the CPU 20 causes the LCD monitor 17 to display thereon the same screen as FIG. 10 in the event that the display position of the second image is operated by touching. In the same manner, an enlarged corresponding image is displayed on the screen of the LCD monitor 17 also in the event that the display position of the third image and the display position of the fourth image are each operated by touching. It is to be noted that indications by a thick line as in the examples of FIG. 9 and FIG. 10 are omitted during reproducing and displaying.

In addition, in the event that an operation signal is input from the function (F) switch 22d during moving image reproduction, the CPU 20 switches the reproduction speed to that of slow reproduction, ⅓ times that in normal time. In the event that an operation signal is input from the function (F) switch 22d during slow reproduction, the CPU 20 switches the reproduction speed from the slow reproduction speed to normal reproduction speed.

In the event of termination of reproduction and display of the moving image file, the CPU 20 continues the display of the image based upon the last one second (i.e., the nth one second) and causes the LCD monitor 17 to superimpose the following message. For example, in the event that the CPU 20 receives an operation signal from the OK switch 22h in a state in which a message "Do you wish to update reproduction information?" is being displayed, the CPU 20 updates the contents of each of the timetable information and the slow reproduction information from those at the start time of reproduction display to those set and operated during reproducing and displaying, and overwrites the tag of the reproduced and displayed moving image file (FIG. 12).

By overwriting the tag, an image according to the tag content can be reproduced at a reproduction speed according to the tag content at the time of the next moving image reproduction. It is to be noted that in the event that the CPU 20 does not receive an operation signal from the OK switch 22h in a state in which a message "Do you wish to update reproduction information?" is being displayed, the CPU 20 does not update the timetable information and the slow reproduction information, and maintains the tag information at the start time of reproduction display.

According to the embodiment explained above, the following operational effects can be achieved.

(1) Since it is arranged that the electronic camera 1 includes the image sensor 12 that captures a subject image at predetermined intervals and outputs image data sequentially and the CPU 20 that causes a plurality of moving image data with different pixel data decimation factors, which are moving image data constituted with image data, to be included in one file, a plurality of moving images with different definitions can be included in one file. As a result, even if a zoom operation is not performed during recording, a moving image in which a wide range is captured and a moving image in which a part of the range is captured can be obtained and included in one file. It is to be noted that although in the embodiment described above, example of the case of the two-image recording and the case of the four-image recording as a plurality of moving image data are explained, the present invention is not limited to these and it may be arranged so as to allow three-image recording or six-image recording as a plurality of moving image data, other than the two-image recording and the four-image recording.

(2) Since it is arranged that a plurality of moving image data include the first image data which represents the first range of the subject image by the first magnification factor and the second image data which represents the second range, which is included in the first range and smaller than the first range, by the second magnification factor, which is larger than the first magnification factor. For example, a moving image in which a whole theater stage is captured and a moving image in which a subject person at the edge of the theater stage is zoomed in can be included in one file.

(3) Since it is arranged that the LCD monitor 17 is caused to display a reproduced moving image based upon the first image data or the second image data, it is possible to display, for instance, a moving image of the whole theater stage or to display a moving image of the subject person at the edge of the theater stage.

(4) Since it is arranged that the TG 15, which controls image-capturing, causes the pixel location, the pixel spacing, and the pixel range of the image sensor 12, which outputs the image data, to be different between when the first image data is output and when the second image data is output, the location, the size, and the range of the obtained image can be controlled in the whole image-capturing screen.

(5) Since it is arranged that the CPU 20 causes a display frame indicating the second range within the first range to be superimposed on the moving image while a moving image based upon the first image data is being reproduced and displayed on the LCD monitor 17, and instructs the TG 15 so as to cause the pixel location, the pixel spacing, and the pixel range of the image sensor 12 to be different in response to an operation signal from the touch operation member, the location, the size, and the range of the obtained image in the whole image-capturing screen can be confirmed by means of the display frame.

(6) Since it is arranged that the CPU 20 controls the LCD monitor 17 so as to switch in response to an operation signal between a reproduction display of a moving image based upon the first image data and a reproduction display of a moving image based upon the second image data, the user can operate with ease to switch between, for instance, display of a moving image of the whole theater stage and display of a moving image of the subject person at the edge of the theater stage.

(7) Since it is arranged that the CPU 20 causes information indicating the correspondence relation between reproduction period of time by the LCD monitor 17 and the moving image data to be reproduced and displayed to be included in one file, the moving image based upon the first image data (or the second image data) can be displayed over a reproduction period of time based upon the above information even without reference to information outside the file.

(8) Since it is arranged that the CPU 20 causes information for reproduction and display at a lower speed than normal speed to be further included in one file, the moving image based upon the first image data (or the second image data) can be reproduced in slow motion at a low speed based upon the above information even without reference to information outside the file.

(9) A video camera that selectively records either image information captured by the camera or image information in which a part of the range of the image information is electronically zoomed in and that selectively displays either image information thereof will be discussed as a comparative example of the electronic camera 1 of the present embodiment. The video camera of the comparative example is cumbersome in change operation of the electronic zoom in the event that an image is reproduced based upon the recorded image information because an electronic zoom-out operation has to be performed if an user wishes to view the whole image while the image information that is electronically zoomed in is being reproduced, whilst an electronic zoom-in operation has to be performed if the user wishes to view a part of the image while image information which is not electronically zoomed in is being reproduced. On the other hand, the CPU 20 of the electronic camera 1 of the present embodiment is configured so as to select one piece of moving image data from a plurality of pieces of moving image data with different definitions, generate a moving image reproduction signal based upon the selected moving image data, and control the above selection so that moving image data is selected in response to an instruction. As a result, a plurality of moving images with different definitions can be appropriately switched and the selected moving image can be reproduced without any cumbersome zoom operation.

(10) Since the CPU 20 controls the electronic camera 1 so as to select moving image data to be reproduced from among a plurality of pieces of moving image data based upon predefined information (timetable information) indicating the relationship between elapsed time from the start time of reproduction and moving image data to be reproduced, definition of the moving image to be reproduced can be automatically switched over.

(11) Since the CPU 20 further controls the electronic camera 1 so as to generate the moving image reproduction signal by switching between a normal reproduction speed and a reproduction speed lower than the normal reproduction speed based upon predefined information (slow reproduction information) indicating elapsed time from the start time of reproduction and a time during which the moving image data is reproduced in slow motion, reproduction speed can be automatically switched over.

(12) Since information indicating the relationship between elapsed time from the start time of reproduction and moving image data to be reproduced, information indicating elapsed time from the start time of reproduction and a time during which the moving image data is reproduced in slow motion, and a plurality of pieces of moving image data are included in one file, a moving image can be appropriately reproduced and displayed even without reference to information outside the file.

(13) Since it is arranged that in response to an operation signal the CPU 20 further modifies information indicating the relationship between elapsed time from the start time of reproduction and moving image data to be reproduced, timetable information can be modified.

(14) Since it is arranged that in response to an operation signal the CPU 20 further modifies information indicating elapsed time from the start time of reproduction and a time during which the moving image data is reproduced in slow motion, slow reproduction information can be modified.

(15) It is arranged that prior to the start of reproduction the CPU 20 further generates a still image reproduction signal so as to display the still images in an array based upon a plurality of pieces of still image data representative of each of a plurality of pieces of moving image data, and selects, from among a plurality of pieces of moving image data, a piece of moving image data corresponding to the still image indicated by an operation signal sent from the operation member while generating this still image reproduction signal. As a result, the user can cause a moving image corresponding to any representative image to be reproduced and displayed as desired.

(16) Since a plurality of pieces of still image data representative of each of a plurality of pieces of moving image data and a plurality of pieces of moving image data are included in one file, a still image reproduction signal for displaying the still images in an array based upon the plurality of pieces of still image data representative of each of the plurality of pieces of moving image data can be generated without reference to information outside the file.

(Variation 1)

A limit may be set upon the size of the display frames indicating image-capturing ranges of the second image to the fourth image. A variable range of the size of the display frame is limited so that, for example, the number of pixels included in the image sensor 12 in a range corresponding to the display frame is greater than the number of pixels constituting a moving image to be recorded. In this manner, when reducing the size of the display frame, the size of the display frame is regulated so that the number of pixels read out from the image sensor 12 without decimation and the number of pixels recorded as a moving image become equal.

(Variation 2)

It may also be arranged that without size limitation on the display frame as the variation 1, in the event that the number of pixels included in the image sensor 12 in a range corresponding to the display frame is less than the number of pixels constituting a moving image to be recorded, data to be recorded as a moving image is generated by interpolating pixel data read out from the image sensor 12 without decimation.

(Variation 3)

It may also be arranged that the aspect ratio of the display frame (i.e., the aspect ratio of the second image to the fourth image) is different from that of the LCD monitor 17. In this case, data to be recorded as a moving image is generated by adding monotone regions up and down or side to side of the second image to the fourth image so as to coincide with the aspect ratio of the LCD monitor 17.

(Variation 4)

It may also be arranged that the two-image recording and the four-image recording is automatically switched according to the set up state of the display frame as described earlier, or it may also be arranged that they are switched in response to the setup menu operation content.

(Variation 5)

It may also be arranged that reception of setup operation (lighting display of the display frame 31) of the display frame indicating an image-capturing range of the second image in the event of the two-image recording and setup operation (lighting display of the display frames 31 to 33) of the display frames indicating image-capturing ranges of the second image to the fourth image in the event of the four-image recording is performed not only prior to the start of recording but also after the start of recording, i.e., during recording.

(Variation 6)

The above explanation presented an example in which the position and the size of the display frames indicating image-capturing ranges of the second image to the fourth image assume the position and the size corresponding to the display frames having been set. In place thereof, it may also be arranged that a main subject is detected from the live view image and set automatically. For instance, the face region of a person in the live view image is detected, and the position and the size of the display frame is automatically determined so as to include the face. It is to be noted that not to mention that a data readout region from the image sensor 12 is varied according to the position and the size of the display frame.

(Variation 7)

Although the above explanation presented an example in which the position of the display frames indicating image-capturing ranges of the second image to the fourth image is fixed at a position as a setup operation was performed thereat, it may also be arranged that the main subject is detected and followed up. For example, the face region of a person in the first image is detected also after the recording is started, the position of the display frame is sequentially determined so as to include the face, and the display frame is automatically moved to the determined position. It is to be noted that not to mention that the data readout region from the image sensor 12 is varied according to the position of the display frame.

(Variation 8)

It may also be arranged not just to detect the face region of a person as a main subject but also to distinguish whether or not it is the face of a pre-registered person. For instance, the face region of the person in the first image is detected also after the recording is started, the position of the display frame is sequentially determined so as to include the face if the face is judged to be that of the registered person, and the display frame is automatically moved to the determined position. The face information of the registered person is captured in advance and stored in the flash memory 19 as reference data.

(Variation 9)

The above explanation presented a method in which the image displayed on the LCD monitor 17 and the reproduction speed during moving image reproduction are determined by the reproduction image signal (FIG. 15) based upon timetable information and slow reproduction information recorded in the tag of a moving image file. Other than that, it may also be arranged that a method in which they are determined based upon scene select information recorded in the tag of a moving image file can be selected. Reproduction display based upon scene select information allows the same image as that displayed on the screen of the LCD monitor 17 during recording to be displayed during moving image reproduction.

(Variation 10)

It may also be arranged to enable a setting not to record the first image (omit) during the two-image recording. Since in this case the CPU 20 does not record the first image (however, it captures the image and reads out image data necessary to display), it is handled that null data has been recorded with respect to the first image.

Figure 17:
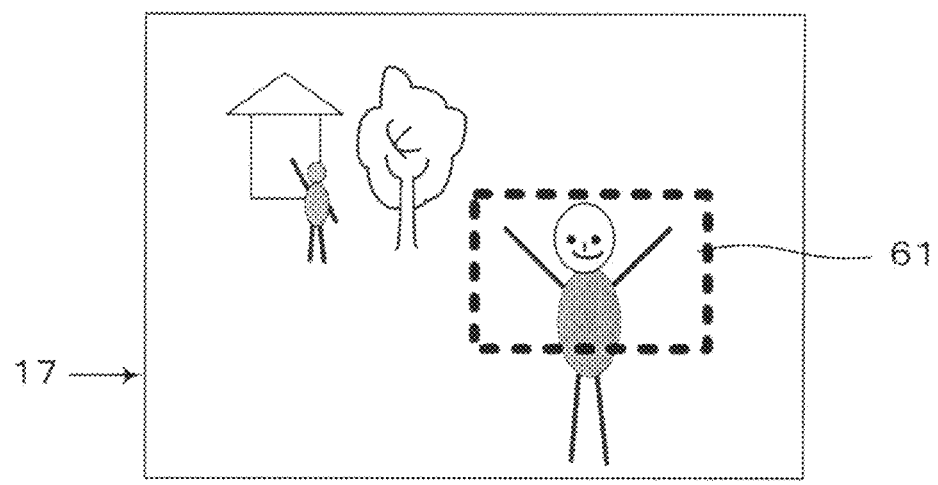
FIG. 17 illustrates an example of the display screen during recording in the event of the variation 10.

FIG. 17 illustrates an example of the display screen of the LCD monitor 17 during recording in the event of the variation 10. The CPU 20 causes the frame 61 indicating an image-capturing range of the second image to be displayed in thick solid line so as to indicate that the second image is being recorded. Unlike the case of FIG. 6, a frame indicating an image-capturing range of the first image is not displayed.

(Variation 11)

In the above explanation, it is arranged that the first image with a low magnification factor and the second image, which is enlarged more than the first image is, (in the event of the four-image recording, in addition, the third image and the fourth image) are obtained on a time sharing basis. In place thereof, it may also be arranged that all the pixel data are read out from the whole image-capturing range of the image sensor 12 without decimation, and one piece of moving image data based upon all the pixel data and information indicating the image-capturing ranges of the first image and the second image (in the event of the four-image recording, in addition, information indicating the image-capturing ranges of the third image and the fourth image) are included in the image file.

The moving image file of the variation 11 is divided by an interval of a predetermined length of time (for example, one second) so as to record it as data for the each predetermined length of time. More specifically, it is recorded as image data for each one second such as the first image for the first one second and the first image for the next one second.

Scene range information, timetable information, slow reproduction information are each recorded in a tag. The scene range information is information indicating scene range (the position and the size of the scene range in an image-capturing range) having been displayed on the screen of the LCD monitor 17 during recording. For instance, it is indicated that the first range (corresponding to the first image of the embodiment described above) was displayed from the first one second to the fifth one second, the third range (corresponding to the third image of the embodiment described above) was displayed from the sixth one second to the tenth one second, and the second range (corresponding to the second image of the embodiment described above) was displayed from the 11th one second to the nth one second.

The timetable information is information indicating a scene range to be reproduced and displayed on the screen of the LCD monitor 17 during reproduction. For example, it is indicated that the first range is to be reproduced and displayed from the first one second to the tenth one second, the second range is to be reproduced and displayed from the 11th one second to the 15th one second, and the fourth range is to be reproduced and displayed from the 16th one second to the nth one second. It is arranged that although the default value of the timetable information is set so as to reproduce and display the first range from the first one second to the nth one second, in the same manner as the above embodiment, the timetable information can be modified by an editing operation for moving image reproduction.

The slow reproduction information is information indicating a section during which the moving image file is reproduced in slow motion during reproduction. For instance, it is indicated that the section from the 12th one second to the 14th one second is to be reproduced at a rate of ⅓ times as slow as that in normal time. It is arranged that although the default value of the slow reproduction information is set so as to reproduce and display the section from the first one second to the nth one second at normal speed, in the same manner as the above embodiment, the slow reproduction information can be modified by an editing operation for moving image reproduction.

Reproduction image signals for display that correspond to each scene range of the second image to the fourth image are generated by reading out decimated pixel data corresponding to each of the scene ranges among all the pixels included in the image sensor 12. The decimation factor is set lower as the scene range is narrower, and thus the magnification factor of an image displayed on the LCD monitor 17 becomes higher. On the other hand, the decimation factor is set higher as the scene range is wider, and thus the magnification factor of an image displayed on the LCD monitor 17 becomes lower.

The above described embodiments are examples, and various modifications can be made without departing from the scope of the invention.

What is claimed is:

1. An imaging device, comprising:
    an image sensor that captures a subject image at predetermined intervals and outputs image data sequentially;
    a file generation unit that records a plurality of pieces of moving image data with different pixel decimation factors from the image data, which are moving image data being generated from the image data as a common source, and information indicating a correspondence relation between a reproduction time of moving image data and moving image data to be reproduced and displayed, the plurality of pieces of moving image data including a first image data which represents a first range of the subject image by a first magnification factor and a second image data which represents a second range, which is included in the first range and narrower than the first range, by a second magnification factor, which is larger than the first magnification factor;
    an image-capturing control unit that controls the image sensor to output the first image data and the second image data in series, causing a pixel location, a pixel spacing, and a pixel range of the same sensor which outputs the image data, to be different between the first and second image data; and
    a display unit on which a moving image reproduced based upon one of the first image data and the second image data is displayed.

2. An imaging device according to claim 1, further comprising:
    a display control unit that causes a display indicating the second range within the first range to be superimposed on a moving image while the moving image reproduced based upon the first image data is being displayed on the display unit;
    an operation member that sends an operation signal; and
    an instruction unit that instructs the image-capturing control unit so as to change a pixel location, a pixel spacing, and a pixel range of the image sensor in response to the operation signal.

3. An imaging device according to claim 1, further comprising:
    an operation member that sends an operation signal; and
    a display control unit that controls the display unit so as to switch according to the operation signal between a reproduction display of a moving image based upon the first image data and a reproduction display of a moving image based upon the second image data.

4. An imaging device according to claim 3, wherein:
    the file generation unit causes the plurality of pieces of moving image data and information indicating a correspondence relation between reproduction time by the display unit and moving image data to be reproduced and displayed to be included in one file.

5. An imaging device according to claim 4, wherein:
    the file generation unit causes information for reproduction and display at a lower speed than a normal speed to be further included in the one file.

6. An imaging device according to claim 1, further comprising:
    a selection unit that selects one moving image data from among the plurality of pieces of moving image data;
    a signal generation unit that generates a moving image reproduction signal based upon the moving image data selected by the selection unit; and
    a selection control unit that controls the selection unit so as to select moving image data according to an instruction.

7. An imaging device according to claim 6, wherein:
    the selection control unit controls the selection unit so as to select moving image data to be reproduced from among the plurality of pieces of moving image data based upon predefined information indicating a relationship between an elapsed time from a start time of reproduction and moving image data to be reproduced.

8. An imaging device according to claim 7, wherein:
    the selection control unit further controls the signal generation unit so as to generate the moving image reproduction signal by switching between a normal reproduction speed and a reproduction speed lower than the normal reproduction speed based upon predefined information indicating an elapsed time from a start time of reproduction and a time during which moving image data is reproduced in slow motion.

9. An imaging device according to claim 8, wherein:
    information indicating a relationship between an elapsed time from the start time of reproduction and moving image data to be reproduced, information indicating an elapsed time from the start time of reproduction and a time during which moving image data is reproduced in slow motion, and the plurality of pieces of moving image data are included in one file.

10. An imaging device according to claim 9, further comprising:
    an operation member that sends an operation signal; and
    an information modification unit that, according to the operation signal, modifies information indicating a relationship between an elapsed time from the start time of reproduction and moving image data to be reproduced.

11. An imaging device according to claim 9, further comprising:
    an operation member that sends an operation signal; and
    an information modification unit that, according to the operation signal, modifies information indicating an elapsed time from the start time of reproduction and a time during which moving image data is reproduced in slow motion.

12. An imaging device according to claim 6, further comprising:
    an operation member that sends an operation signal, wherein:
    the signal generation unit further generates, prior to a start of reproduction, a still image reproduction signal so as to display the still images in an array based upon a plurality of pieces of still image data representative of each of the plurality of pieces of moving image data; and the selection control unit controls the selection unit so as to select, from among the plurality of pieces of moving image data, moving image data corresponding to a still image indicated by the operation signal sent from the operation member while the signal generation unit is generating the still image reproduction signal.

13. An imaging device according to claim 12, wherein:

the plurality of pieces of still image data representative of each of the plurality of pieces of moving image data and the plurality of pieces of moving image data are included in one file.

* * * * *